(12) United States Patent
Miyake

(10) Patent No.: US 6,853,736 B2
(45) Date of Patent: Feb. 8, 2005

(54) IMAGE PROCESSING APPARATUS, IMAGE PROCESSING METHOD AND STORAGE MEDIUM

(75) Inventor: Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

(21) Appl. No.: 09/774,586

(22) Filed: Feb. 1, 2001

(65) Prior Publication Data

US 2001/0028726 A1 Oct. 11, 2001

(30) Foreign Application Priority Data

Feb. 4, 2000 (JP) ........................................ 2000-027611
May 30, 2000 (JP) ........................................ 2000-160310

(51) Int. Cl.$^7$ ................................................ G06K 9/00
(52) U.S. Cl. ........................ 382/100; 382/258; 713/176
(58) Field of Search ................................. 382/100, 112, 382/102, 148, 258, 156, 232, 233, 234, 235, 236, 239, 248, 260, 263, 190, 195; 358/3.07, 464, 450; 348/445; 707/103; 702/191; 713/176

(56) References Cited

U.S. PATENT DOCUMENTS

| | | | | |
|---|---|---|---|---|
| 4,751,585 A | * | 6/1988 | Shibazaki | 358/464 |
| 5,148,501 A | * | 9/1992 | Enomoto et al. | 382/233 |
| 5,469,274 A | * | 11/1995 | Iwasaki et al. | 358/450 |
| 5,760,921 A | * | 6/1998 | Miyake | 358/3.07 |
| 5,818,970 A | * | 10/1998 | Ishikawa et al. | 382/248 |
| 5,822,462 A | * | 10/1998 | Miyake | 382/251 |
| 5,889,868 A | | 3/1999 | Moskowitz et al. | 380/51 |
| 5,912,710 A | * | 6/1999 | Fujimoto | 348/445 |
| 5,933,798 A | * | 8/1999 | Linnartz | 702/191 |
| 6,041,331 A | * | 3/2000 | Weiner et al. | 707/103 |

FOREIGN PATENT DOCUMENTS

| | | |
|---|---|---|
| EP | 0 920 185 A2 | 6/1999 |
| EP | 0 951 175 A2 | 10/1999 |

OTHER PUBLICATIONS

Kiyoshi Tanaka, et al., "Embedding Secret Information Into A Dithered Multi–Level Image", IEEE, XP010002776 (Sep. 30, 1990), pp. 261–220.

Kiyoshi Tanaka, et al., "Embedding the Attribute Information Into A Dithered Image", *Systems and Computers in Japan*, vol. 21, No. 7, XP000172926, 1990, pp. 43–50.

"An Adaptive Algorithm for Spatial Gray Scale", R. Floyd, et al., SID Symposium Digest of Paper, pp. 36–27, 1975.

* cited by examiner

*Primary Examiner*—Yon J. Couso
*Assistant Examiner*—Seyed Azarian
(74) *Attorney, Agent, or Firm*—Fitzpatrick, Cella, Harper & Scinto

(57) ABSTRACT

In order to extract, from an image in which predetermined information is embedded, such predetermined information at a high speed and with high precision, the invention provides an image processing apparatus comprising an input unit for entering an image in which predetermined information is embedded, a process unit for filtering the entered image with plural filters having different characteristics respectively, a detection unit for detecting plural feature amounts based on conversion values obtained by the filtering, and an extraction unit for extracting the predetermined information based on thus detected plural feature amounts.

17 Claims, 17 Drawing Sheets

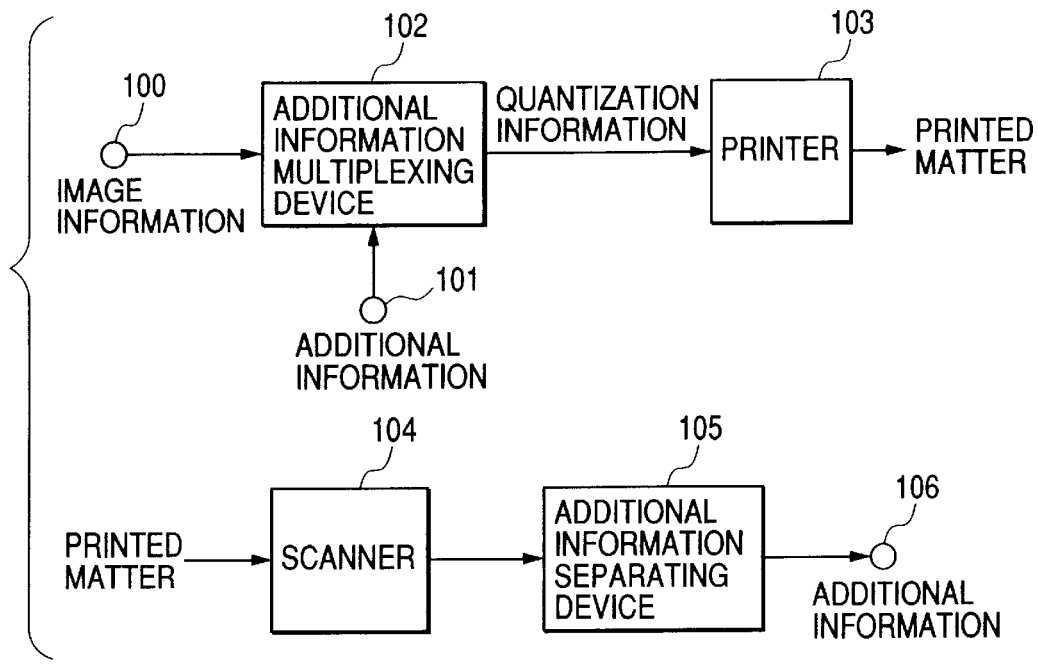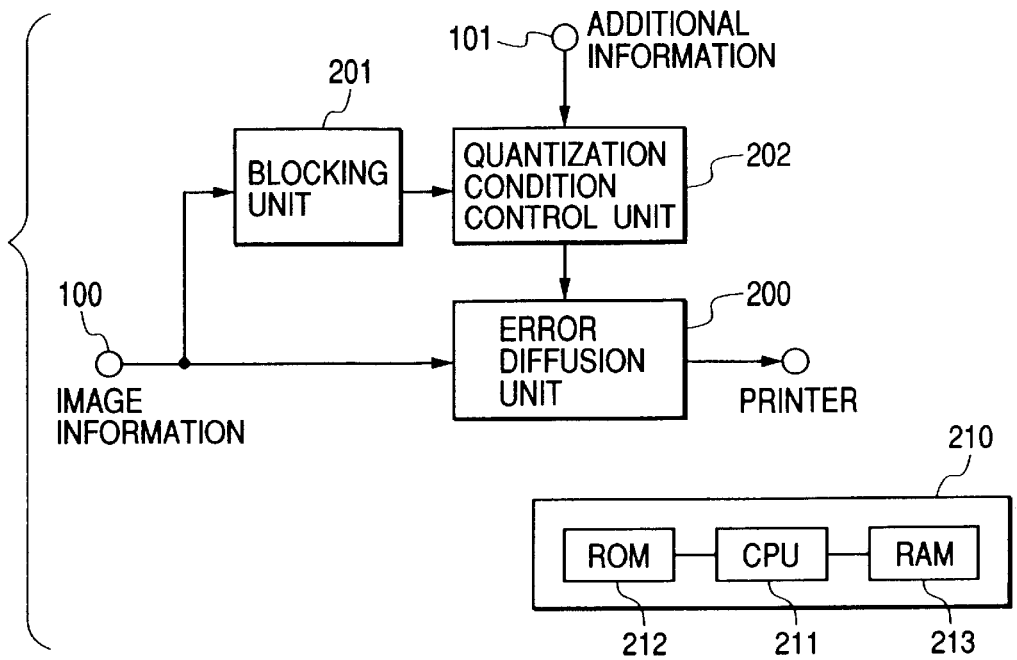

FIG. 12

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG. 13

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

FIG. 17

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG. 18

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

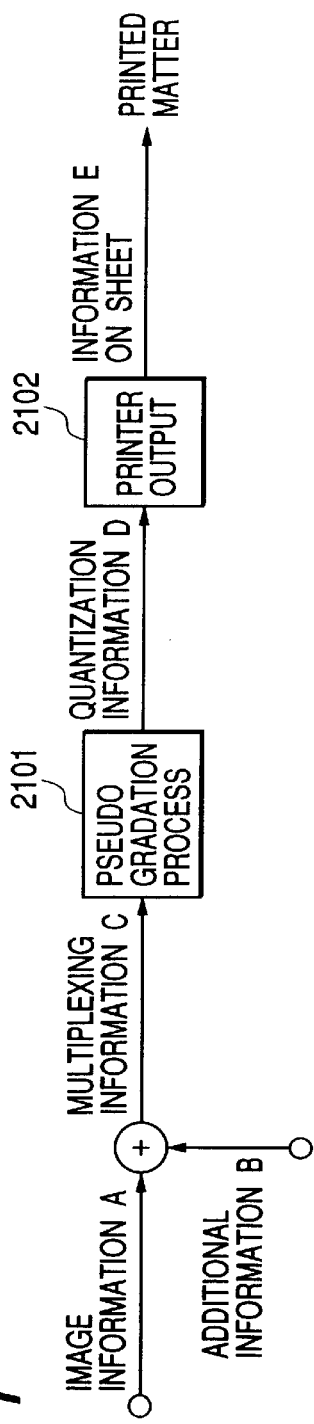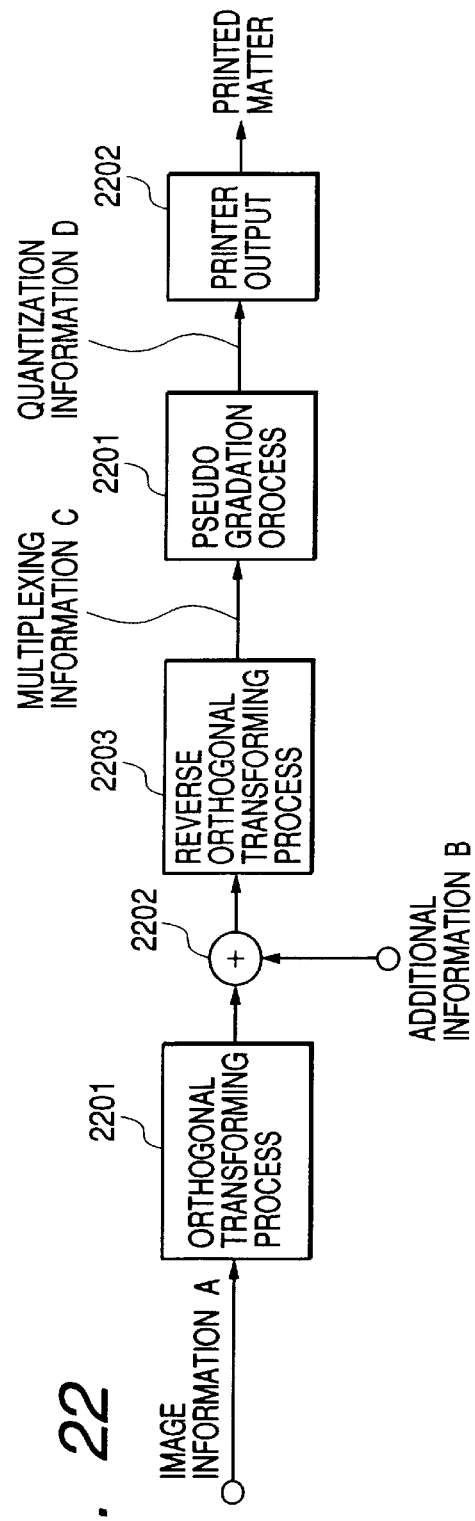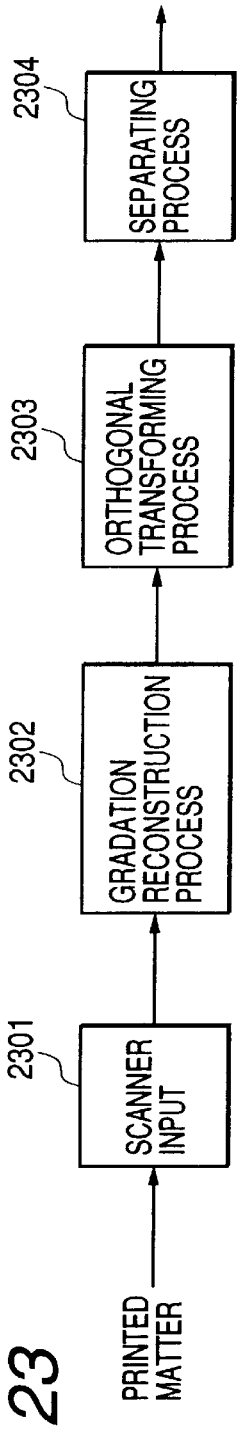

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, an image processing method and a storage medium.

2. Related Background Art

There have conventionally been executed developments for multiplexing, in the image information, other information related with the image.

Recently there is being standardized so-called digital watermarking technology, for multiplexing, in image information such as a photograph or a picture, additional information such as the name of author thereof or whether the use thereof is permitted, in a visually not easily recognizable manner, for communication through a network such as internet.

For another application, with progress in the image quality of the image output apparatus such as a copying apparatus or a printer, it is required to prevent illegal forging of banknotes, stamps, valuable papers etc., there is developed a technology of embedding additional information in the image, in order to identify the output apparatus and the machine number of such apparatus from the image outputted on a sheet of paper.

For embedding the additional information in the image, there is conventionally known a technology of multiplexing the information by embedding the additional information in a high frequency region of a color difference component or a saturation component of low visual sensitivity in the image.

However, the aforementioned technologies are associated with the following drawbacks. FIG. 20 shows the mode of embedding of ordinary additional information in the digital watermarking technology, wherein image information A and additional information B are multiplexed through an adding unit 2001 into a multiplexed information C.

FIG. 20 shows an example of multiplexing the additional information in the real space area of the image information. If the multiplexed information C can be communicated without image processing such as various filterings or encoding such as irreversible encoding, the additional information B can be easily decoded from the multiplexed information B even in the conventional technology. The image information communicated in the internet can be decoded, if such information has certain noise resistance, even after passing a digital filter for image quality improvement such as edge enhancement or smoothing.

However, let us assume a case of printing the multiplexed image by an output apparatus such as a printer, and extracting the additional information from the obtained print. Also it is assumed that the printer to be used has a representing ability of two to several gradation levels per single color. In the recent ink jet printing, there are commercially available the apparatus capable of representing several gradation levels per single color by utilizing inks of low dye concentration or variably controlling the output dot diameter, but the gradation of the photographic image cannot be expected unless a pseudo gradation process is adopted. Thus, in the aforementioned assumption of outputting the multiplexed image utilizing the digital watermarking technology shown in FIG. 20 by a printer, the multiplexed information C is changed into quantized information D by a pseudo gradation process 2101 as shown in FIG. 21, and is further changed into significantly deteriorated on-paper information (print) E by printing on paper by a printer 2102. Therefore, the decoding of the additional information from the information on paper for the aforementioned purpose of forging prevention corresponds to the decoding of the additional information B from the on-paper information E after a series of processes shown in FIG. 21. The amount of information change by the processes 2101, 2102 is very large, so that it is very difficult to multiplex the additional information in a visually unrecognizable manner and to correctly decode such multiplexed additional information from the information on the paper.

On the other hand, FIG. 22 shows an example of a conventional digital watermarking technology of converting the image information in a frequency area for example by Fourrier transformation, instead of the real space area and executing synthesis for example in a high frequency region. Referring to FIG. 22, the image information is transformed into a frequency area by an orthogonal transformation process 2201, and the additional information is added by an adding device 2202 in a specified frequency which is visually not easily recognizable. After returning to the real space area by a reserver orthogonal transformation process 2203, there are passed filters involving major changes of pseudo gradation process and printer output, as in the case shown in FIG. 21.

FIG. 23 shows the procedure of separation of the additional information from the on-paper information. The information of the print is entered by passing the print through an image reading device 2301 such as scanner. The entered information, having gradational representation by a pseudo gradation process, is subjected to a reconstruction process 2302 which is a reverse pseudo gradation process. The reconstruction process is generally conducted with a LPF (low-pass filter). After the reconstructed information is subjected to an orthogonal transformation process 2303, the embedded information is separated in separation means 2304, from the electric power of a specified frequency.

As will be apparent from FIGS. 22 and 23, many complex processes are involved from the multiplexing of the additional information to the separation thereof. In case of a color image, a color conversion process for converting into the colors specific to the printer is also included in such series of processes. In order to achieve satisfactory separation even after such complex processes, it is necessary to introduce a signal of very high resistance. It is difficult to introduce a signal of high resistance while maintaining satisfactory image quality. Also the presence of plural complex process steps leads to a very long process time required for multiplexing and for separation.

Also, in the above-described conventional technologies, the information is added to the high frequency region, but, if the error diffusion method is executed in the pseudo gradation process of the later stage, the band area of the additional information may be mixed in the band area of the texture generated by error diffusion because of the characteristics of the high pass filter specific to the error diffusion method, whereby the failure of decoding becomes highly probable. Also, a scanner device of a very high precision is required for decoding. Thus the process shown in FIGS. 21 and 22 is not suitable if the pseudo gradation process is to be employed. Stated differently, there is required a multiplexing method for the additional information, exploiting the features of the pseudo gradation process.

As an example of combining the multiplexing of the additional information with the redundancy of the pseudo gradation process, there is known a conventional technology to be explained in the following.

At first, there is known a method of mixing data into the image signal by, in binary digitization with a systematic dither method, selecting either one of the dither matrixes representing a same gradation level. However, it is difficult to output the photographic high image quality by the systematic dither method unless there is employed a printer of a high resolution with a very excellent mechanical precision, because even a slight aberration in the mechanical precision results in a noise of low frequency such as lateral streaks which can be easily recognized on the paper.

Also a periodical change in the dither matrix disturbs the band of a specified frequency generated by the regularly arranged dither matrixes, thereby detrimentally affecting the image quality. Also the gradation representing ability differs significantly by the kind of the dither matrix. Particularly on paper, the change in the area rate resulting for example from overlapping of the dots varies depending on the dither matrixes, so that the density may be varied by the switching of the dither matrix even in an area where the signal represents a uniform density. Also in the decoding (separating) side, erroneous decoding is highly probable in the decoding method of estimating the dither matrix used in the binary digitization in a state where the pixel value of the image information, constituting the original signal, is unknown.

As another example, there is known a method of employing a color dither pattern and multiplexing the additional information by the arrangement of such dither pattern. Also in this method, the deterioration in image quality is unavoidable as in the foregoing method. Also in comparison with the foregoing method, though the additional information of a larger amount can be multiplexed, there will result a change in the color hue caused by the change in the arrangement of the color components, leading to a larger deterioration of the image quality particularly in a flat area. Furthermore, it is anticipated that the decoding on the paper becomes more difficult.

In any case, the aforementioned both methods utilizing the change in the dither matrix is associated with a drawback of difficulty in the decoding while the deterioration in the image quality is large.

Therefore, the present applicant already proposed a method of embedding codes by artificially preparing combinations of quantized values that are not generated in the ordinary pseudo gradation process, utilizing the texture generated by the error diffusion method.

This method does not visually deteriorate the image quality, since the shape of the texture is changed only microscopically. Also the density of the areal gradation can be maintained by a method of varying the quantizing threshold value for the error diffusion method, so that the multiplexing of a different signal can be achieved quite easily. However, in the above-proposed method, it is required, in the decoding side, to judge whether the texture is artificial or not. In the print on the paper, the texture may not be satisfactorily reproduced because of an aberration in the dot position from the desired ink landing position for example by a droplet deviation. Also in a color image, the multiplexing is principally conducted in a color component of lowest visual sensitivity, but the judgment of texture in the real space area is easily influenced by other color components, so that the separation of the multiplexed information becomes difficult.

Also for embedding a large amount of information such as audio information in an image, there is already known a conventional technology of converting the audio information into dot codes or so-called two-dimensional bar codes, and printing such codes in a marginal area of the image or in the image itself. In this method, however, the dot code and the image information do not constitute multiplexing of two different information, and the codes are not rendered unrecognizable visually. For reducing recognizability there is proposed a method of embedding the codes with a transparent paint in the image, but such method requires a special ink, thus leading to an increased cost, and the quality of the image outputted on paper is naturally deteriorated.

SUMMARY OF THE INVENTION

In consideration of the foregoing, an object of the present invention is to provide an image processing apparatus, an image processing method and a storage medium therefor, capable of solving at least one of the aforementioned drawbacks.

Another object of the present invention is to provide an image processing apparatus, an image processing method and a storage medium therefor, capable of precisely extracting, from an image in which predetermined information is embedded, such predetermined information at a high speed.

The above-mentioned objects can be attained, according to an embodiment of the present invention, by an image processing apparatus comprising input means for entering an image in which predetermined information is embedded, process means for filtering the entered image with plural filters of respectively different characteristics, detection means for detecting plural feature amounts based on the converted values after the above-mentioned filterings, and extraction means for extracting the predetermined information based on thus detected plural feature amounts.

According to another embodiment of the present invention, there is provided an image processing apparatus comprising input means for entering an image in which predetermined information is embedded, thinning means for executing a pixel thinning process on the entered image based on a predetermined regularity, detection means for detecting a feature amount based on the thinned pixels obtained from the thinning means, and extraction means for extracting the predetermined information based on thus detected feature amount.

The present invention is to provide an image processing apparatus, an image processing method and a storage medium, having novel functions.

Still other objects of the present invention, and the features thereof, will become fully apparent from the following description of the embodiments, to be taken in conjunction with the accompanying drawings.

BRIEF DESCRIPTION OF THE DRAWINGS

FIG. 1 is a schematic block diagram showing an image processing system embodying the present invention;

FIG. 2 is a schematic block diagram showing an additional information multiplexing device shown in FIG. 1;

FIGS. 12 and 13 are views showing examples of thinning process;

FIGS. 17 and 18 are views showing examples of thinning process;

FIGS. 20, 21 and 22 are block diagrams showing examples of conventional multiplexing; and FIG. 23 is a block diagram showing an example of conventional separation.

DESCRIPTION OF THE PREFERRED EMBODIMENTS

Figure 3:
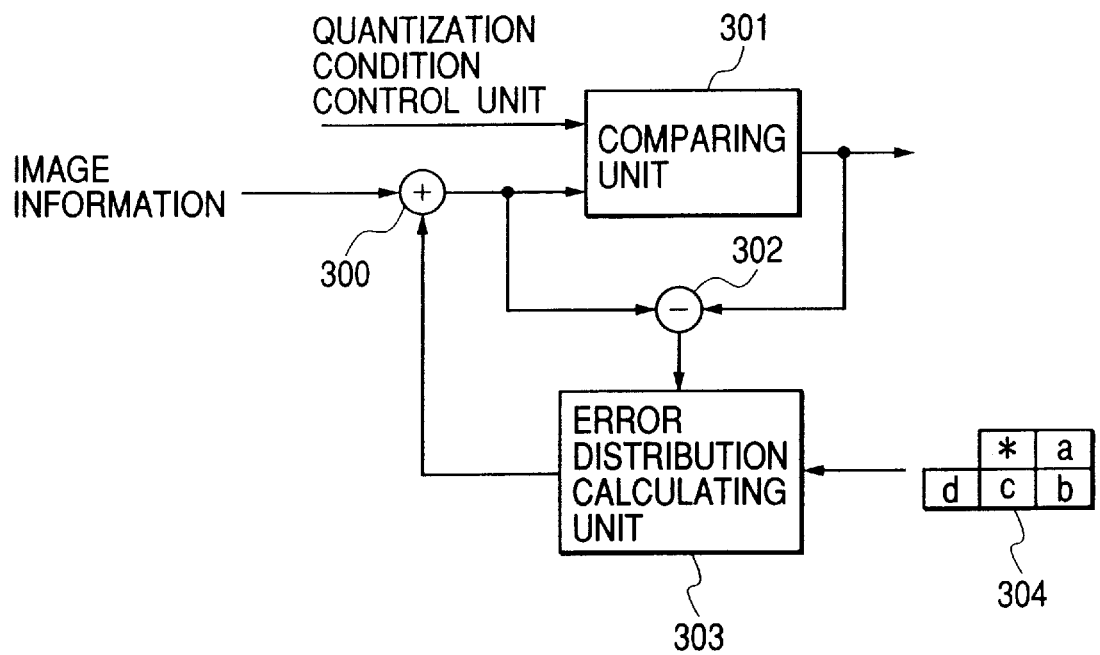
FIG. 3 is a schematic block diagram showing error diffusion means shown in FIG. 2.

Now the present invention will be clarified in detail by preferred embodiments thereof, with reference to the accompanying drawings. The image processing apparatus in the present embodiment can be efficiently incorporated as a printer driver software or an application software in a computer for preparing image information to be outputted to a printer engine, but it can also be effectively incorporated as a hardware or a software in the main body of a copying apparatus, a facsimile apparatus or a printer.

[First Embodiment]

FIG. 1 is a block diagram showing the configuration of an image processing system constituting a first embodiment.

Input terminals 100, 101 are provided for respectively entering multi-level image information and additional information to be embedded in the image information. Such additional information is different from the image information entered from the input terminal 100, and can be, for example, audio information, text document information, various information on the image entered from the input terminal 100 such as copyright, date and time of image taking, location of image taking, image taking person etc. or completely different image information.

An additional information multiplexing device 102 is to embed the additional information in a visually not easily recognizable manner, in the image information. In addition to the multiplexing of the additional information, it is also used for quantizing the entered multi-level information.

A printer 103 outputs the information prepared by the additional information multiplexing device by a printer engine. The printer is assumed to be a printer capable of achieving the gradational representation by a pseudo gradation process, for example an ink jet printer, or a laser beam printer.

The outputted print is processed by a scanner 104 for reading the information on the print, and the additional information embedded in the print is separated by an additional information separating device 105 and is outputted to an output terminal 106.

FIG. 2 is a block diagram showing the configuration of the additional information multiplexing device 102 shown in FIG. 1.

An error diffusion unit 200 converts the image information entered from the input terminal 100 into quantized levels of a number less than the number of input gradation levels, by a pseudo gradation process utilizing the error diffusion method, thereby representing the gradation by area of the quantized values of plural pixels.

A block formation unit 201 divides the input image information into blocks each having a predetermined area. The block formed by the block formation unit 201 can be rectangular or of any other shape.

A quantizing condition control unit 202 changes or controls the quantizing condition for each of the block areas formed by the block formation unit 201.

In the quantizing condition control unit 202, the quantizing condition is controlled in the unit of each block, based on the additional information entered from the input terminal 101.

A control unit 210 is composed of a CPU 211, a ROM 212, a RAM 213, etc.

The CPU 211 controls the function and process of the above-mentioned various units according to a control program stored in the ROM 212. The RAM 213 is used as a work area for the CPU 211.

FIG. 3 is a block diagram showing the details of the error diffusion unit 200. The general error diffusion process is described in detail by R. Floyd and L. Steinberg, "An Adaptive Algorithm for Spatial Grayscale", SID Symposium Digest of Paper pp.36 to 37 (1975).

In the following there will be given an explanation, as an example, on an error diffusion process having binary quantized values.

An adding device 300 adds the value of a object pixel in the entered image information and quantization errors distributed from already binary quantized surrounding pixels.

A comparing unit 301 compares the result of addition including the errors with a quantization threshold value from the quantizing condition control unit 202, and outputs "1" if the predetermined threshold value is larger but outputs "0" otherwise. For example, in case of representing the gradation of a pixel with a precision of 8 bits, the representation is commonly achieved by the maximum value "255" and the minimum value "0".

It is assumed that a dot (ink or toner) is printed on the paper when the quantized value is "1". A subtracting device 302 calculates the error between the result of quantization and the aforementioned result of addition, and an error distribution calculating unit 303 distributes the error to the surrounding pixels which are to be subjected to quantization thereafter.

An error distribution table 304, experimentally determined according to the distance from the object pixel, is prepared in advance, and the error is distributed with proportions recorded in the distribution table. The distribution table 304 shows distribution to the four surrounding pixels, but such configuration is not restrictive.

Figure 4:
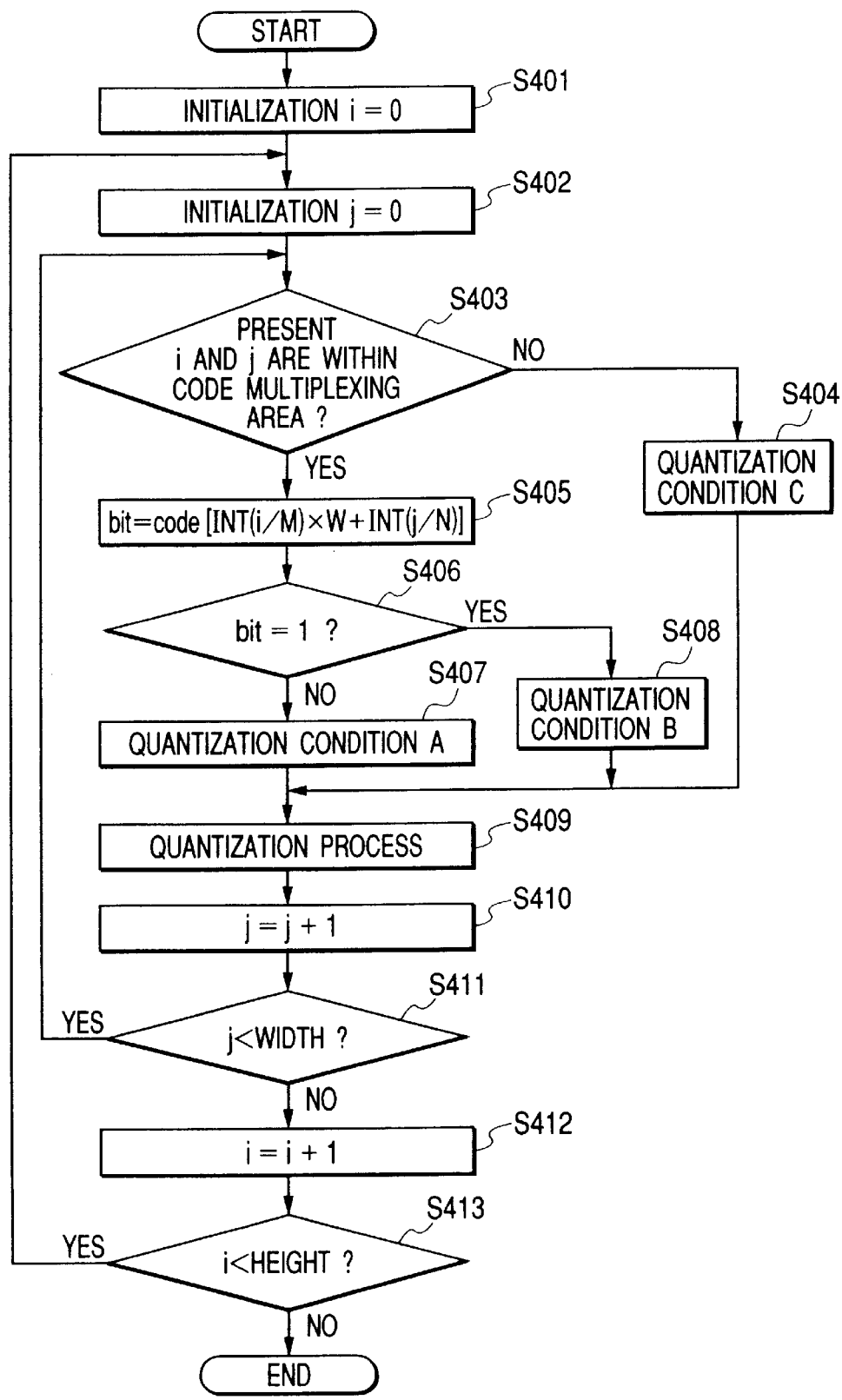
FIG. 4 is a flow chart showing the operation sequence of a multiplexing process including quantization control means.

Now reference is made to a flow chart shown in FIG. 4, for explaining the operation sequence of the entire configuration including the quantizing condition control unit 202, in an example of utilizing binary quantized values.

S401 is a step for initializing a variable i, for counting the address in the vertical direction.

S402 is a step for initializing a variable j, for counting the address in the horizontal direction. S403 is a discriminating step based on the address (i, j), and discriminates whether the coordinate (i, j) representing the currently processed address belongs to an area where the multiplexing process is to be executed.

Figure 5:
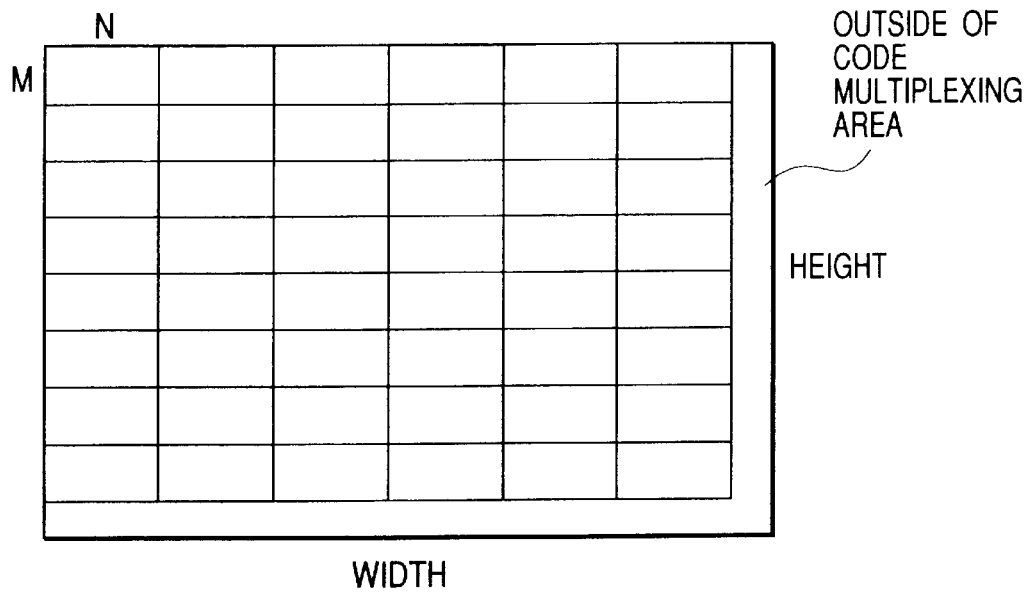
FIG. 5 is a view showing an example of block formation.

In the following there will be given an explanation on the multiplexing area with reference to FIG. 5, representing an image with a pixel number WIDTH in the horizontal direction and a pixel number HEIGHT in the vertical direction. It is assumed that the additional information is multiplexed in such image. The image is divided into blacks, each having N pixels in the horizontal direction and M pixels in the vertical direction, starting from the upper left corner of the image as the original point. In the present embodiment, the block formation is executed from a reference point positioned at the original point, but it is also possible to select a point distant from the original point, as the reference point. In order to multiplex the information as large as possible in such image, the blocks of N×M pixels each are arranged starting from the reference point. Thus a number W of blocks that can be arranged in the horizontal direction and a number H of blocks that can be arranged in the vertical direction are represented by:

$$W = INT(WIDTH/N) \quad (1)$$

$$H = INT(HEIGHT/M) \quad (2)$$

wherein INT( ) indicates the integral part of the value in the parentheses.

In the equations (1) and (2), a number of pixels corresponding to the remainder of the division in each equation corresponds to an edge portion after the arrangement of plural blocks of N×M pixels each and becomes outside the multiplexing area.

Referring to FIG. 4, if a step S403 identifies that the currently processed object pixel is outside the multiplexing area, a step S404 sets a quantizing condition C. On the other hand, if such pixel is identified inside the multiplexing area, the additional information to be multiplexed is read. For the purpose of simplicity, the additional information is assumed to be represented by each bit in an arrangement code[ ]. For example, if the additional information consists of information of 48 bits, the arrangement code[ ] exists from code[0] to code[47], each containing a bit.

A step S405 substitutes the information in the arrangement code[ ] in a variable "bit" in the following manner:

$$bit = code[INT(i/M) \times W + INT(j/N)] \quad (3)$$

Then a step S406 discriminates whether the substituted variable bit is "1". The information in the arrangement code[ ] is 1 bit as explained above, so that the value of the variable bit is also "0" or "1".

If the step S406 identifies "0", a step S407 sets a quantizing condition A, but, if the step S406 identifies "1", a step S408 sets a quantizing condition B.

Then a step S409 executes quantizing process based on thus set quantizing condition. Such quantizing process corresponds to the error diffusion method explained in FIG. 3.

Then a step S410 counts up the variable j in the horizontal direction, and a step S411 discriminates whether the variable is smaller than WIDTH which is the number of pixels in the horizontal directions of the image, and the foregoing process is repeated until the number of processed pixels reaches WIDTH. When the process in the horizontal direction is completed for the pixel number WIDTH, a step S412 counts up the variable i in the vertical direction, and a step S413 discriminates whether the variable is smaller than HEIGHT which is the number of pixels in the vertical direction of the image, and the foregoing process is repeated until the number of processed pixels reaches HEIGHT.

The above-described operation sequence allows to change the quantizing condition in the unit of a block consisting of N×M pixels.

In the following there will be explained examples of the quantizing conditions A, B and C. In the error diffusion method, various factors can be considered as the quantizing condition, the quantizing threshold value is taken as the quantizing condition in the first embodiment. Since the quantizing condition C is used only outside the multiplexing area, there can be adopted any quantizing threshold value. In the gradational representation with 8 bits per pixel and with binary quantization levels, the maximum value "255" and the minimum value "0" constitute the representative values of quantization as explained in the foregoing, and a middle value "128" is often selected as the quantizing threshold value. Thus, in the quantizing condition C, the quantizing threshold value is fixed at "128".

As the quantizing condition A and B are used in a block in the multiplexing area, a difference in the image quality has to be generated by the difference in the quantizing condition. However, such difference in the image quality has to be so represented as not easily recognizable visually and has to be easily identifiable from the paper.

Figure 6A:
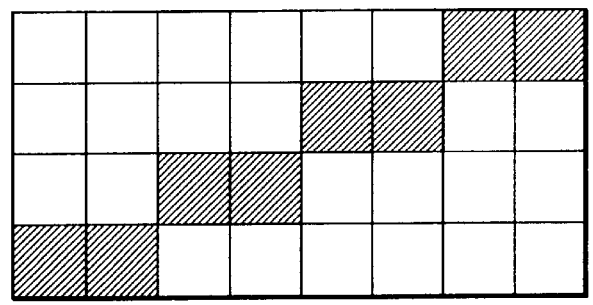
FIGS. 6A and 6B are views showing examples of change of the quantization threshold value in the quantizing condition.
Figure 6B:
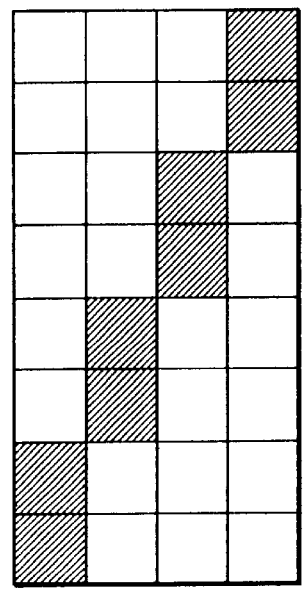

FIGS. 6A and 6B show examples of the quantizing conditions A, B. FIG. 6A shows the period of change of the quantizing threshold value in the quantizing condition A. In FIG. 6A, each square represents a pixel, and a white square has a fixed threshold value while a gray square has a variable threshold value. Thus, in the example shown in FIG. 6A, there is formed a matrix of 8 pixels in the horizontal direction and 4 pixels in the vertical direction, and protruding threshold values are set only in the gray squares.

In the example shown in FIG. 6B, different from the example shown in FIG. 6A, there is formed a matrix of 4 pixels in the horizontal direction and 8 pixels in the vertical direction, and protruding threshold values are set only in the gray squares.

In case a pixel has gradational values of 8 bits as explained in the foregoing, there are selected, as an example, "128" as the fixed threshold value and "10" as the protruding threshold value. With a lower quantizing threshold value, the quantized value of the object pixel tends to become "1" (quantizing representative value "255"). Thus, the quantized value "1" tends to appear in the gray squares both in FIGS. 6A and 6B. Stated differently, in the blocks of N×M pixels each, there are mixed blocks in which dots are generated in the arrangement of the gray squares in FIG. 6A and those in which dots are generated in the arrangement of the gray squares in FIG. 6B.

In the error diffusion method, a slight change in the quantizing threshold value does not significantly affect the image quality. In the systematic dither method, the image quality of gradational representation is significantly affected by the dither pattern to be used. However, in the error diffusion method in which the quantizing threshold value is regularly changed as explained in the foregoing, the determining factor of the image quality in the gradational representation is the error diffusion method, so that a slight change in the dot arrangement or a change in the texture generation scarcely affects the image quality of the gradational representation. This is because, even in case of a change in the quantizing threshold value, the error or difference between the signal value and the quantized value is diffused in the surrounding pixels, so that the point signal value is conserved macroscopically. Stated differently, the error diffusion method has a very large redundancy in the dot arrangement and in the texture generation.

In the following there will be given an explanation on the additional information separating device 105 in the image processing system shown in FIG. 1.

Figure 7:
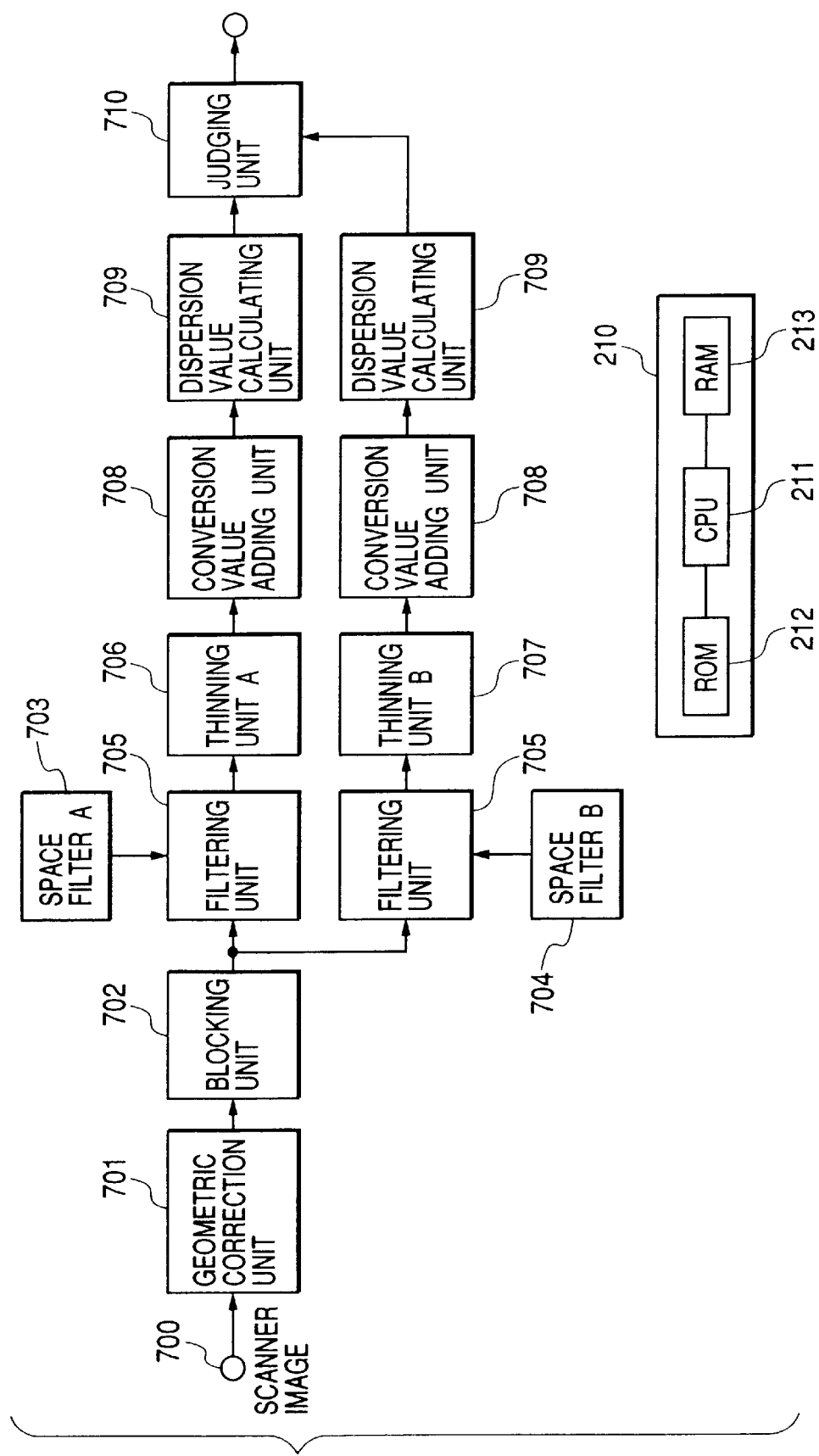
FIG. 7 is a schematic block diagram showing the configuration of an additional information separating device in a first embodiment.

FIG. 7 is a block diagram showing the configuration of the additional information separating device 105. For the purpose of simplicity, as in the foregoing example of the additional information multiplexing device 102, there will be explained an example of separation from a print in which the additional information of a bit is multiplexed in each of the divided blocks. Naturally, the amount of information added per block in the multiplexing device becomes equal to that separated per block in the separating device.

An input terminal 700 enters image information read by the scanner 104. The resolution of the scanner to be used is preferably equal to or larger than the resolution of the printer to be used for preparing the print. In order to precisely read the dot information of the print, the scanner is naturally required, based on the sampling principle, to have a resolution at least equal to twice of the resolution of the printer. However, the presence of dot can be identified to a certain extent, though not precisely, if the resolution of the scanner is at least equal to that of the printer. In the first embodiment, for the purpose of simplicity, the resolution of the scanner is assumed to be equal to that of the printer.

A geometric aberration detection unit 701 detects the geometrical aberration of the image entered by the scanner. Because of the output operation by the printer and the input operation by the scanner, the image information read by the scanner 104 and entered from the input terminal 700 may be significantly different geometrically from the image information prior to the output by the printer. Therefore, the geometric aberration detection unit 701 detects 4 points in the end portions, in the print, where the image information is assumed to be printed. If the resolution of the printer is equal to that of the scanner, a major factor to be corrected is the rotation (inclination) of the image resulting from skewed feeding of the paper in the printer or from an aberration in the setting of the print in the scanner. The detection of 4 points in the end portions allows to judge the amount of aberration in the rotational direction.

A blocking unit 702 executes block formation in the unit of P×Q pixels. This block should not be larger than the block of N×M pixels formed at the multiplexing. Thus:

$P \leq N$, and $Q \leq M$ (4)

Also the block formation in the unit of P×Q pixels is executed with a skipping of a certain interval, in such a manner that an area assumed to a block of N×M pixels at the multiplexing includes a block of P×Q pixels. The skipped number of pixels is basically N pixels in the horizontal direction and M pixels in the vertical direction, but it is necessary to divide the aberration amount, detected by the geometric aberration detection means 701 by the number of blocks to obtain the aberration amount per block and to execute correction by adding such aberration amount to the skipped number of pixels.

Figure 8:
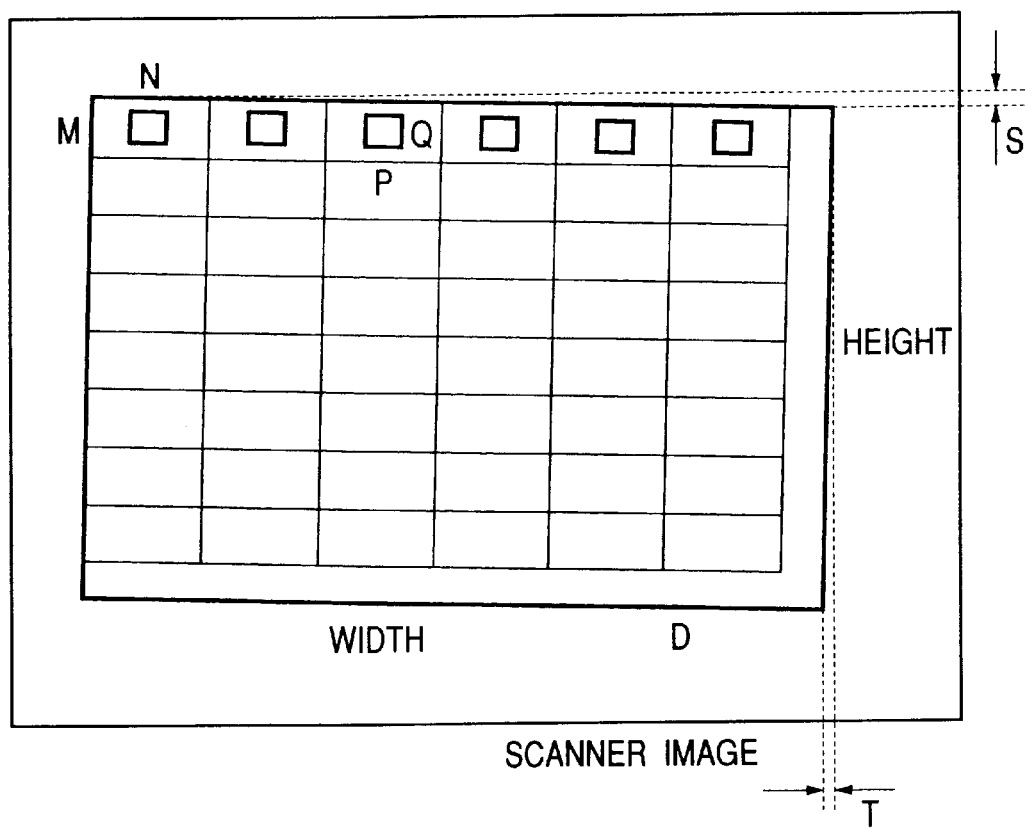
FIG. 8 is a view showing an image inclination in a scanned image.

FIG. 8 shows the block formation with correction of aberration. In FIG. 8, a largest rectangular area represents the scanner image transmitted from the scanner 104, and a large inner area D surrounded by thick lines indicates an image print area where the print is assumed to be present. The aberration of the image information in the rotational direction can be judged by detecting 4 points of the end portions of the image print area D. The end portion can be detected for example by recording a marker indicating the end portion, in advance at the printing, or by the density difference between a white area of the paper and the image print area. Based on an aberration T in the horizonal direction and an aberration S in the vertical direction, the aberration amount (T', S') per block is calculated as follows:

$T' = T \times M / \text{HEIGHT}$ (5)

$S' = S \times N / \text{WIDTH}$ (6)

A small rectangular area surrounded by thick lines represents a block formed with P×Q pixels. For the purpose of simplicity, the blocks are shown only in the upper first row. Based on the block formation correction according to the equations (5) and (6), the start position of each block is so controlled that an area assumed to constitute a block of N×M pixels at the multiplexing includes a block of P×Q pixels.

Figures 9A, 9B, 10:
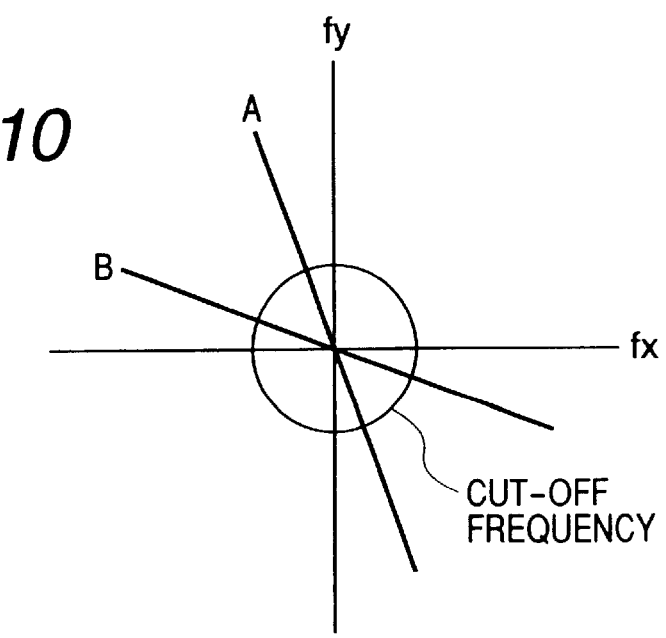
FIGS. 9A and 9B are views showing examples of a spatial filter.
FIG. 10 is a view showing a frequency vector in a two-dimensional frequency area.

703 and 704 respectively indicate spatial filters A, B of different characteristics, and 705 indicates a digital filtering unit for summing the products with the surrounding pixels. The coefficients of the filters are prepared according to the period of the variable threshold values in the quantizing condition at the multiplexing. It is assumed that the additional information is multiplexed by changing the quantizing condition in the multiplexing device with the two periods as shown in FIGS. 6A and 6B. FIGS. 9A and 9B show examples of the spatial filters A 703, B 704 to be used in the separating device in such condition. In these drawings, the center in 5×5 pixels constitutes the object pixel, and other 24 pixels constitute the surrounding pixels. Also blank pixels indicates that the filtering coefficient is "0". As will be apparent from the drawings, FIGS. 9A and 9B show edge enhancing filters, in which the direction of the edge to be enhanced coincides with the direction of the variable threshold values in multiplexing. Thus, the configurations shown in FIGS. 9A and 9B are so prepared as to respectively match those shown in FIGS. 6A and 6B.

Then, thinning units 706, 707 execute a thinning process according to a certain rule, on the signal after filtering (hereinafter called conversion value) in the block of P×Q pixels. In the first embodiment, the rule of thinning is separated into the periodicity and the phase. More specifically, the thinning units 706, 707 have different periods of thinning and respectively execute plural thinning processes with different phases. The method of thinning will be explained later.

A conversion value adding unit 708 adds, for each phase, the conversion values thinned by the thinning units 706, 707. The above-mentioned thinning process and the adding process of the conversion values correspond to the extraction of the electric power of the predetermined frequency vector enhanced by the spatial filter.

A dispersion value calculating unit 709 calculates, for each periodicity, the dispersion of the plural values added for each phase.

A judging unit 710 judges the multiplexed sign, based on the dispersion value at each periodicity.

FIG. 10 schematically shows the first embodiment in a two-dimensional frequency area, wherein the abscissa indicates the frequency in the horizontal direction while the ordinate indicates the frequency in the vertical direction. The original point at the center represents a DC component, and the frequency becomes higher as the distance from the original point increases. A circle in the drawing indicates a cut-off frequency by error diffusion. The filter of the error diffusion method has the characteristics of a high pass filter (HPF) by which the low frequency region is cut off, and the cut-off frequency varies according to the density of the object image.

A change in the quantizing threshold value changes the frequency characteristics generated after the quantization, and a change in the quantizing threshold value shown in FIG. 6A or 6B generates a large power spectrum respectively on the frequency vector A or B shown in FIG. 10. At the separation, the multiplexed signal can be judged by the detection of the frequency vector where such large power spectrum is generated. It is therefore required to individually enhance and extract each frequency vector.

FIGS. 9A and 9B correspond to HPF's having directions of specified frequency vectors. More specifically, the spatial filters shown in FIGS. 9A and 9B can enhance the frequency vectors respectively on the lines A and B. As an example, it is assumed that a change in the quantizing condition according to FIG. 6A generates a large power spectrum on the frequency vector on the line A in FIG. 10. In such situation, the spatial filter shown in FIG. 9A amplifies the amount of change in the power spectrum, but that shown in FIG. 9B scarcely amplifies such amount of change. Therefore, in the parallel filtering with plural spatial filters, the amplification takes place only in a spatial filter with the coinciding frequency vector but scarcely takes place in other filters, so that the frequency vector generating a large power spectrum can be readily identified.

Figure 11:
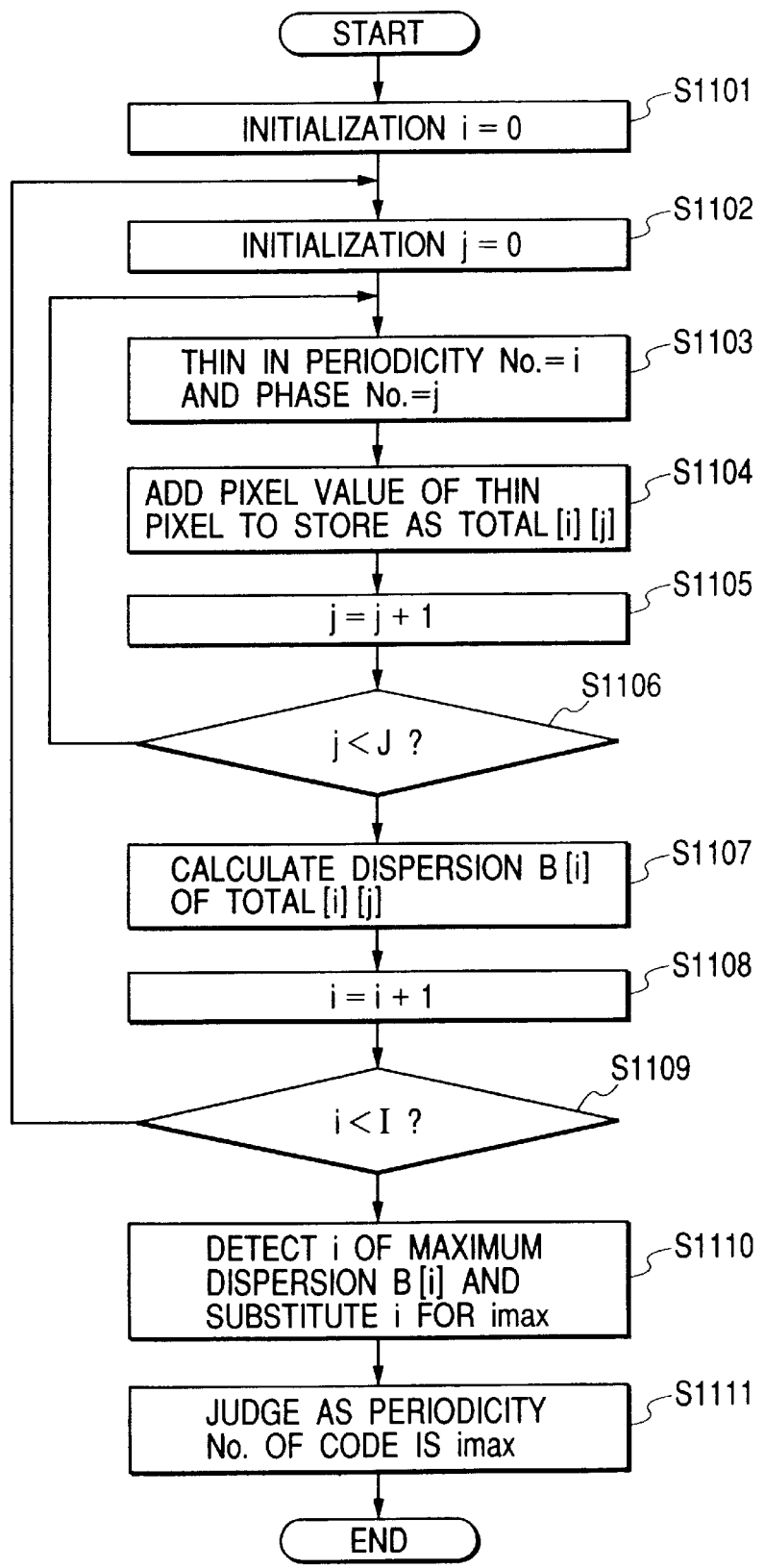
FIG. 11 is a flow chart showing the operation sequence of a thinning unit, an adding unit and a judging unit.

FIG. 11 is a flow chart showing the operation sequence of the thinning units 706, 707, conversion value adding unit 708, dispersion value calculating unit 709 and judging unit 710 shown in FIG. 7.

In FIG. 11, steps S1101, S1102 are variable initializing steps, in which the variables i, j to be employed in the present flow are initialized to 0.

A step S1103 determines the factors of regularity of thinning by the thinning units 706, 707, namely determines the two factors of "periodicity" and "phase". In the present flow, the variable i relates to the periodicity while the variable j relates to the phase. The conditions of the periodicity and the phase are managed by numbers, and there are set the factor for a thinning method having a periodicity number (No) i and a phase No j.

A next step S1104 adds the conversion values thinned within the block. The added value is memorized as a variable arrangement TOTAL[i][j].

A step S1105 counts up the variable j and a step S1106 compares it with a fixed value J, indicating the number of thinning processes by the changes of the phase. If the variable j is smaller than J, the sequence returns to the step S1103 for repeating the thinning process and the addition of the thinned pixels based on a new phase No. j after the upcounting.

If the thinning process and the adding process with a change in the phase is completed by a predetermined number of times, a step S1107 calculates the dispersion value of the added results TOTAL[i][j]. Thus, there is evaluated the level of dispersion of the added results depending on the phase. More specifically, there is determined the dispersion value B[i] for the TOTAL[i][j] of a total number of J, for a fixed variable value i.

Then a step S1108 counts up the variable i, and a step S1109 compares it with a fixed value I, indicating the number of thinning processes with the change of the periodicity. If the variable i is smaller than I, the sequence returns to the step S1102 for repeating the thinning process and the addition of the thinned values based on a new periodicity No. i after the upcount.

When the step S1109 identifies that the variable i is equal to the preset number, the dispersion value B[i] has been obtained by the number I. A step S1110 detects the maximum value of the dispersion value from the group of I dispersion values, and substitutes the value i into a variable imax.

A code judging step S1111 judges a code, of which the periodicity No is imax, as the multiplexed code.

In the following there will be shown an example with I=2 and J=4. FIGS. 12 and 13 show, in a table format, the thinning method for a block size of P=Q=16. In these drawings, a square in the block represents a pixel. In these drawings, the block is formed as a square (P=Q), but such example is not restrictive and the block may naturally assume a rectangular or other form.

FIG. 12 shows a thinning method in case the periodicity No is 0 (corresponding to the thinning unit A 706 in FIG. 7), while FIG. 13 shows a thinning method in case the periodicity No is 1 (corresponding to the thinning unit B 707 in FIG. 7). In the drawings, the value in each pixel of the block indicates the thinned pixel at a phase No. j. For example, a pixel bearing a number "0" corresponds to a thinned pixel when j=0. Thus, each of FIGS. 12 and 13 employs 4 phases and shows the thinning methods for the phase No. j=0 to 3.

The periodicities shown in FIGS. 12 and 13 respectively correspond to those in FIGS. 6A and 6B. As explained in the foregoing the quantized value "1" (in case of binary values "1" and "0"), tends to appear frequency in the gray squares both in the cases of FIGS. 6A and 6B. Therefore, for a block employing the quantizing condition A at the multiplexing, the quantized value "1" tends to appear with the periodicity shown in FIG. 6A, then such frequency component is further amplified by the filtering with the matching spatial filter, and the thinning and addition of the conversion values with the periodicity shown in FIG. 12 leads to a large dispersion in the results of addition.

On the other hand, in case the block employing the quantizing condition A is subjected to filtering with an unmatched spatial filter and to thinning with the periodicity shown in FIG. 13, the results of addition of the conversion values show a smaller dispersion. This is because, due to the difference in the periodicity of the quantizing condition and of the thinning, the results of addition of the conversion values are averaged by the different phases in the thinning, thereby showing a smaller fluctuation. Inversely, in a block employing the quantizing condition B at multiplexing, the thinning shown in FIG. 12 results in a smaller dispersion and that shown in FIG. 13 results in a large dispersion.

In the example of the flow chart shown in FIG. 4, in which bit=0 and bit=1 are respectively assigned to the quantizing condition A and B, the situation bit=0 or bit=1 can be identified respectively if a large dispersion is found for the periodicity No.=0 or for the periodicity No.=1.

In summary, the multiplexing and separation can be easily realized by correlating the quantizing condition, the characteristics of the spatial filter and the periodicity of the thinning condition. In the present embodiment, the periodicity No. is limited to two values of "1" and "0" and the multiplex code in the block is limited to 1 bit, but the multiplex code can naturally contain a larger information amount. Naturally the number of kinds of the quantizing condition, that of kinds of the spatial filter and that of kinds (indicated by I value) of the periodicity No. of the thinning condition coincide mutually.

In the foregoing first embodiment, the codes can be easily separated without the comparison of the electric powers of the frequencies corresponding to the regularities of the quantizing conditions by orthogonal transformation. In addition, a process in the real space area allows to realize the separation process at a very high speed.

In the first embodiment described in the foregoing, the quantizing conditions A, B, the spatial filters A, B and the thinning devices A, B merely constitute an example and are not restrictive. For example, there may be adopted other periodicities, and the number of spatial filters, the block size for thinning etc. may be made larger or smaller than in the above-described example.

Also the operation sequence shown in FIG. 11 adopts a repeating process based on the variable i constituting the periodicity No. and the variable j constituting the phase No. for easier understanding of the concept of the present invention.

In practice, however, it is easier to adopt a repeating process based on the pixel addresses in the block of P×Q pixels. More specifically, such process can be realized by storing, in advance as a table, two information consisting of the periodicity No. and the phase No. for each pixel address in the block as shown in FIGS. 12 and 13, and adding the conversion values to the variables of the corresponding periodicity No. and phase No. Such process allows to calculate, in parallel, the added values of the groups of the periodicity No. and the phase No. by processing P×Q pixels only.

Also the operation sequence in FIG. 11 judges the code by calculating the dispersions of the results of addition of the thinned conversion values after spatial filtering and comparing the magnitude of the dispersions, but such process is not restrictive, and there can be conceived other methods utilizing the comparison by an evaluating function not dependent on the dispersion. Since the results of addition of the thinned conversion values with the phase changes tend to show a distinct value only at a phase, it is desirable to evaluate the "level of scattering".

For evaluating the level of scattering, there can be conceived, for example, the following evaluating functions:

1) difference between the maximum and minimum values among the values of addition of the thinned conversion values;
2) difference between the maximum value and a second largest value, or difference between the minimum value a second smallest value, among the values of addition of the thinned conversion values; and
3) maximum difference, in a histogram of the values of addition of the thinned conversion values, between the two neighboring values.

The above-mentioned evaluating functions 1, 2, 3 utilize absolute difference values, but a relative ratio of such difference to the conversion value, the pixel value or the total sum of the pixel values or conversion values may also be employed as an evaluating function. Also in the foregoing description, binary digitization has been explained as an example of quantization, but such example is not restrictive.

As explained in the foregoing, the first embodiment allows to embed predetermined information in an image by changing the quantizing condition in the unit of a block of N×M pixels formed in the image and quantizing the image according to such quantizing condition, thereby achieving high-speed information embedding with reduced deterioration of the image quality and enabling precise extraction of the embedded information, in comparison with the conventional information embedding method, for example based on the orthogonal transformation.

As a result, the multiplexing of the additional information in the image information can be easily realized, thereby enabling to provide services and applications of embedding audio information or secret information in the image information. It is also rendered possible to prevent illegal forging of the banknotes, stamps and valuable papers, and to avoid infringement of the copyright of the image information.

Also the aforementioned predetermined information can be extracted by dividing the image, in which the predetermined information is embedded, into image areas of P×Q pixels each, executing parallel filtering on thus divided image areas with the plural filters of respectively different characteristics, thinning the conversion values after the filtering with the predetermined regularity, detecting plural feature amounts based on the results of addition of the thinned conversion values and utilizing thus detected plural features amounts, whereby the information embedded in the image can be extracted at a higher speed and with a higher precision, in comparison with the conventional information extracting method, for example based on the orthogonal transformation.

[Second Embodiment]

Figure 14:
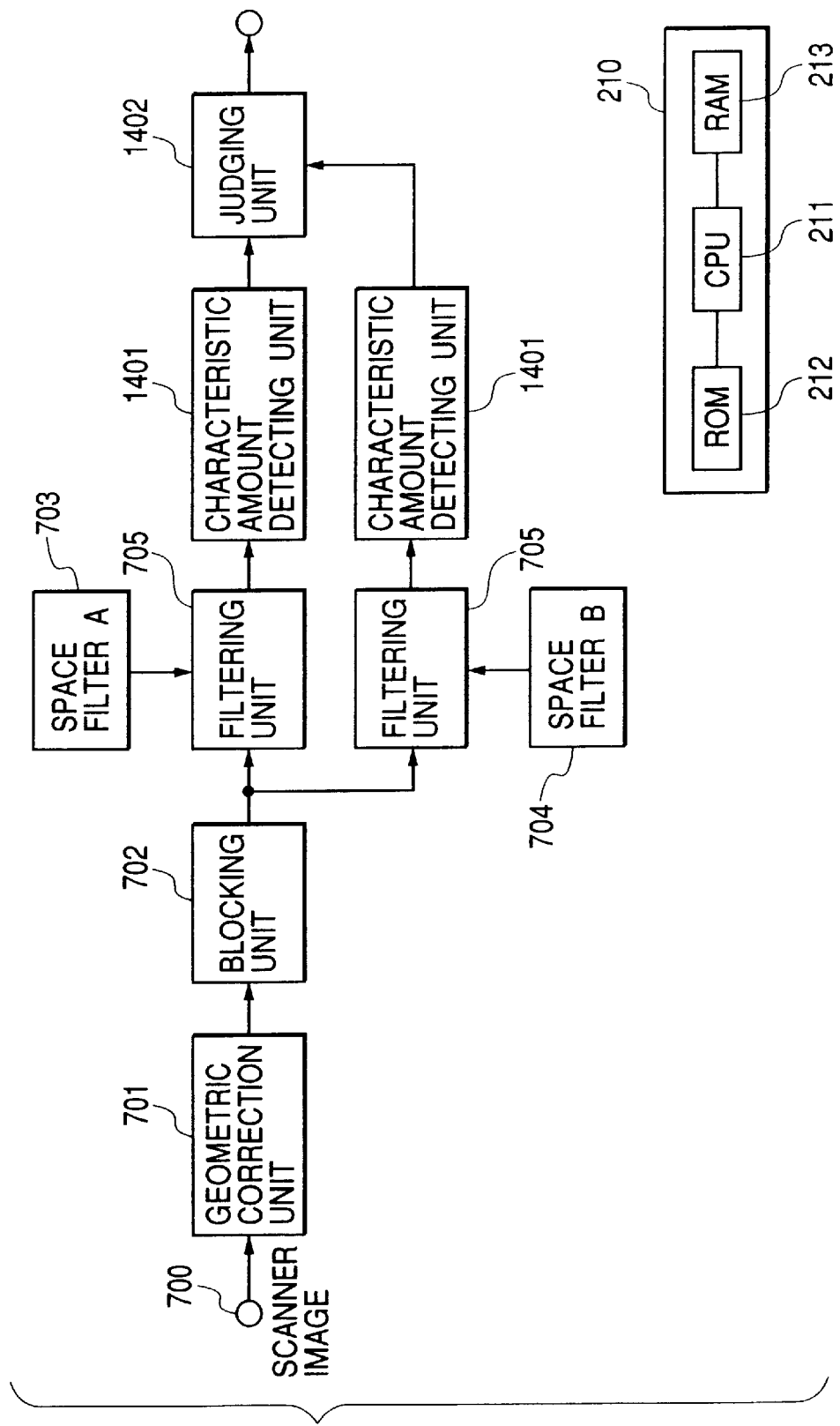
FIG. 14 is a schematic block diagram showing the configuration of an additional information separating device in a second embodiment.

FIG. 14 is a block diagram showing the configuration of an additional information extracting device in a second embodiment. As the configuration shown in FIG. 14 is different merely in a part from that in FIG. 7, equivalent components are represented by corresponding numbers and the following description will be given only on the different points.

Referring to FIG. 14, a feature amount detection unit 1401 detects a certain feature amount, based on the conversion values after filtering by the filtering unit 705 consisting of the spatial filter A 703 and the spatial filter B 704. The feature amount to be detected can be, for example:

1) maximum value of the conversion values within the block after digital filtering;
2) difference between the maximum and minimum values between the conversion values within the block after digital filtering; or
3) dispersion of the conversion values within the block after digital filtering.

In contrast to the first embodiment shown in FIG. 7, the second embodiment does not execute the thinning process and the adding process, and can therefore realize the separating process at a higher speed. In the second embodiment, the spatial filters are preferably so selected, as shown in FIGS. 9A and 9B, that the sum of the filter coefficients is "0" in order to eliminate the DC component.

The detection value from the feature amount detection unit 1401 is supplied to judging means 1402 which judges the multiplexed signal by comparison of the magnitude of the value.

As explained in the foregoing, the second embodiment allows to extract predetermined information by dividing the image, in which the predetermined information is embedded, into image areas of P×Q pixels each, executing parallel filtering on thus divided image areas with the plural filters of respectively different characteristics, detecting plural feature amounts based on the conversion values after the filtering and utilizing thus detected plural features amounts, whereby the information embedded in the image can be extracted at a higher speed and with a higher precision, in comparison with the conventional information extracting method, for example based on the orthogonal transformation.

Also in comparison with the foregoing first embodiment, the information embedded in the image can be extracted with an even higher speed, since the thinning process and the adding process are not executed.

As explained in the foregoing, the filtering is executed on the image in which the predetermined information is embedded, with the plural filters having different characteristics respectively, plural feature amounts are detected based on the conversion values obtained by the filtering and the predetermined information is extracted based on the detected plural features amounts, thus the information embedded in the image can be extracted at a higher speed and with a higher precision, in comparison with the conventional information extracting method, for example based on the orthogonal transformation.

[Third Embodiment]

Figure 15:
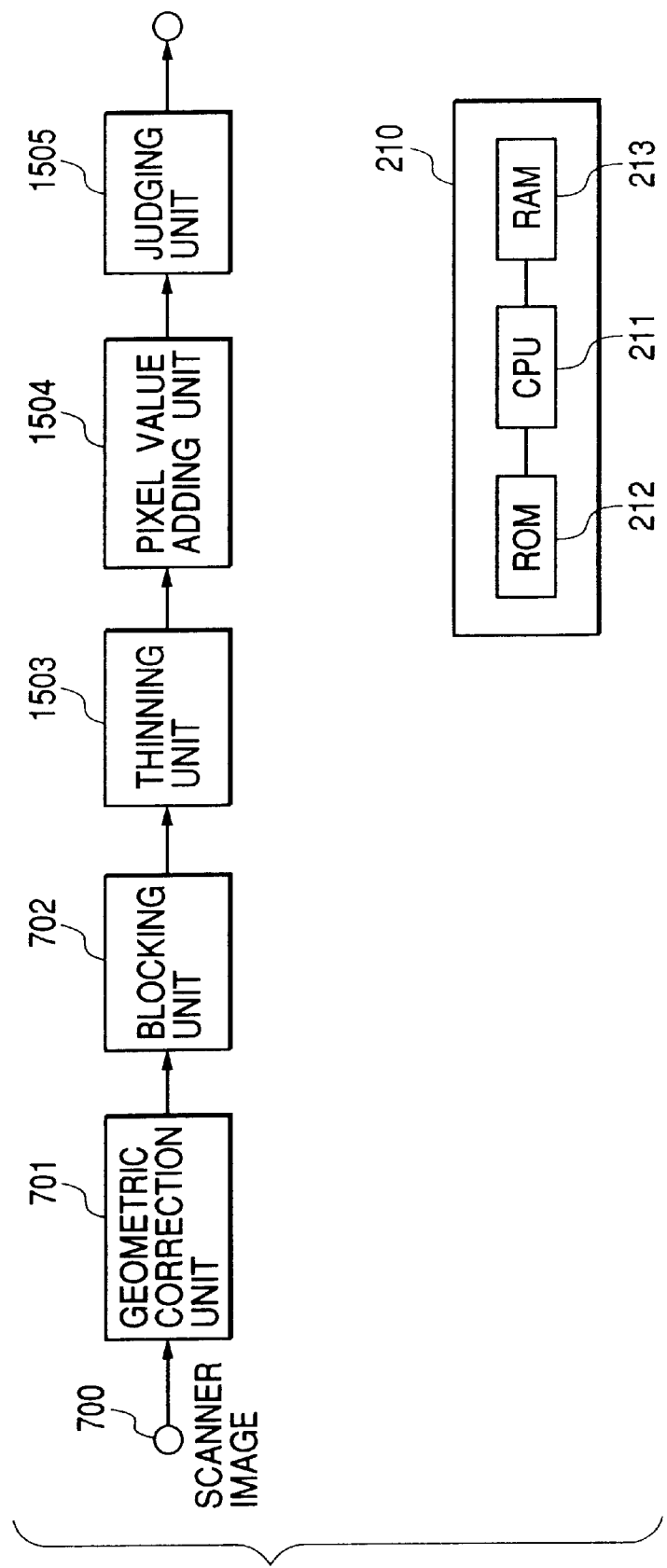
FIG. 15 is a schematic block diagram showing the configuration of an additional information separating device in a third embodiment.

FIG. 15 is a block diagram showing the configuration of an additional information extracting device 105 in a third embodiment. As the configuration shown in FIG. 15 is different merely in a part from that in FIG. 7, equivalent components are represented by corresponding numbers and the following description will be given only on the different points.

A thinning unit 1503 executes a thinning process, according to a certain regularity, on the pixels in a block of P×Q pixels. In the present embodiment, such regularity is separated in the periodicity and the phase. The thinning method will be explained later. A pixel value adding unit 1504 adds the pixels of the thinned pixels, and a judging unit 1505 judges the multiplexed code based on the result of addition.

Figure 16:
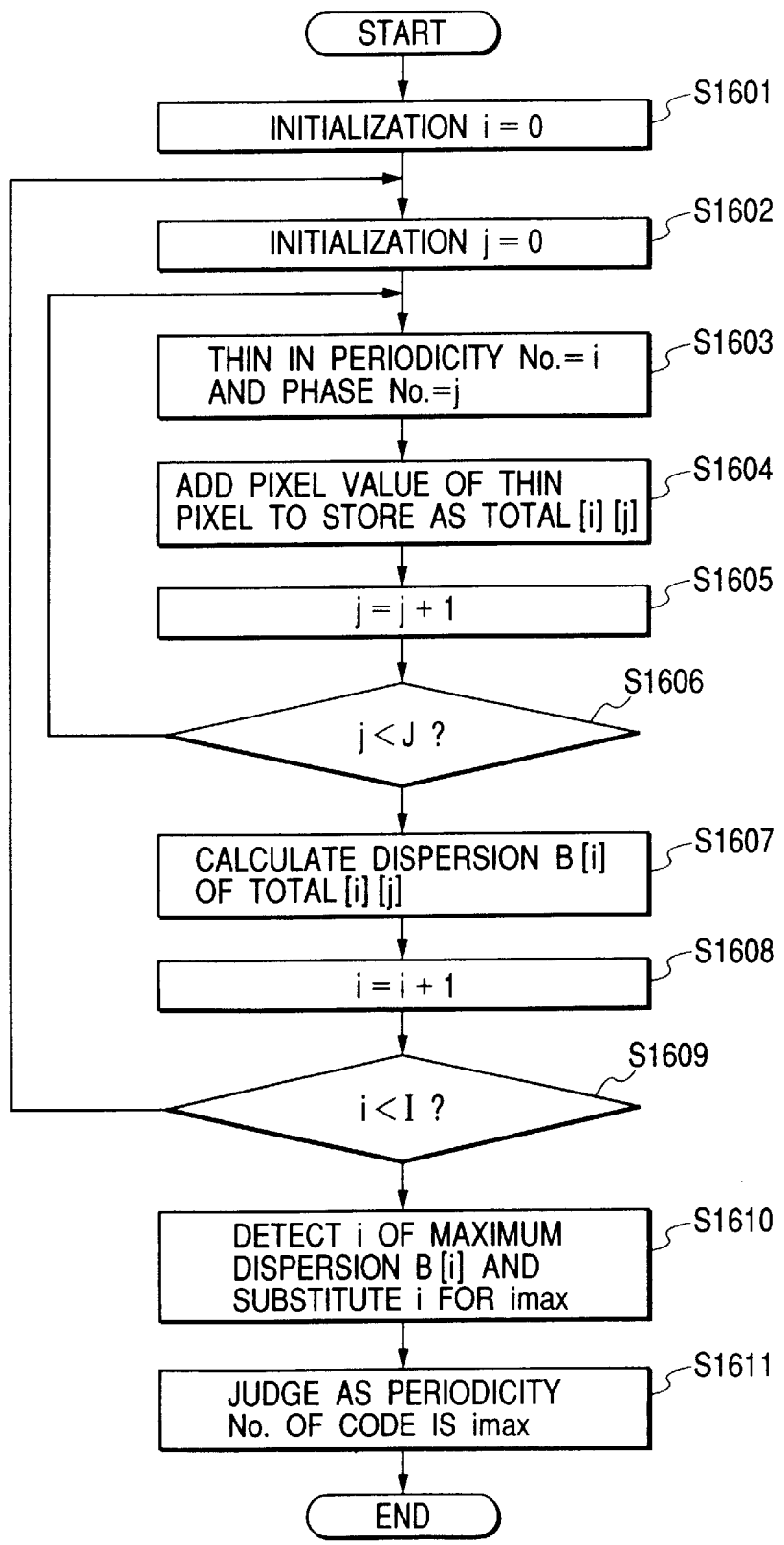
FIG. 16 is a flow chart showing the operation sequence of a thinning unit, an adding unit and a judging unit.

FIG. 16 is a flow chart showing the function sequence of the thinning unit 1503, pixel value adding unit 1504 and judging unit 1505 shown in FIG. 15.

In FIGS. 16, steps S1601, S1602 are variable initializing steps, in which the variables i, j to be employed in the present flow are initialized to 0.

A step S1603 determines the factors of regularity of thinning by the thinning unit 1503, namely determines the two factors of "periodicity" and "phase". In the present flow, the variable i relates to the periodicity while the variable j relates to the phase. The conditions of the periodicity and the phase are managed by numbers and there are set the factor for a thinning method having a periodicity number (No) i and a phase No. j.

A next step S1604 adds the conversion values thinned within the block. The added value is memorized as a variable arrangement TOTAL[i][j].

A step S1605 counts up the variable j and a step S1606 compares it with a fixed value J, indicating the number of thinning processes by the changes of the phase. If the variable j is smaller than J, the sequence returns to the step S1603 for repeating the thinning process and the addition of the thinned pixels based on a new phase No. j after the upcounting.

If the thinning process and the adding process with a change in the phase is completed by a predetermined number of times, a step S1607 calculates the dispersion value of the added results TOTAL[i][j]. Thus, there is evaluated the level of dispersion of the added results depending on the phase difference. More specifically, there is determined the dispersion value B[i] for the TOTAL[i][j] of a total number of J, for a fixed variable value i.

Then a step S1608 counts up the variable i, and a step S1609 compares it with a fixed value I, indicating the number of thinning processes with the change of the periodicity. If the variable i is smaller than I, the sequence returns to the step S1602 for repeating the thinning process and the addition of the thinned values based on a new periodicity No. i after the upcounting.

When the step S1609 identifies that the variable i is equal to the preset number, the dispersion value B[i] has been obtained by the number I. A step S1610 detects the maximum of the dispersion value from the group of I dispersing values, and substitutes the value i into a variable imax.

A code judging step S1611 judges a code, of which the periodicity No is imax, as the multiplexed code.

In the following there will be shown an example with I=2 and J=4. FIGS. 17 and 18 show, in a table format, the thinning method for a block size of P=Q=16. In these drawings, a square in the block represents a pixel. In these drawings, the block is formed as a square (P=Q), but such example is not restrictive and the block may naturally assume a rectangular or other form.

FIG. 17 shows a thinning method in case the periodicity No is 0, while FIG. 18 shows a thinning method in case the periodicity No is 1.

In these drawings, the value in each pixel of the block indicates the thinned pixel at a phase No. i. For example, a pixel bearing a number "0" corresponds to a thinned pixel when i=0. Thus, each of FIGS. 17 and 18 employs 4 phases and shows the thinning methods for the phase No. i=0 to 3.

The periodicities shown in FIGS. 17 and 18 respectively correspond to those in FIGS. 6A and 6B. As explained in the foregoing the quantized value "1" (in case of binary values "1" and "0"), tends to appear frequently in the gray squares both in the cases of FIGS. 6A and 6B. Therefore, for a block employing the quantizing condition A at the multiplexing, the quantized value "1" tends to appear with the periodicity shown in FIG. 6A, so that, by thinning with the periodicity shown in FIG. 10, the added values of thinned pixels show a larger dispersion. This is because the added value becomes larger in the thinning operation with a phase frequently including the quantized value "1", and becomes smaller in the thinning with a phase frequently including the quantized value "0".

On the other hand, in case the block employing the quantizing condition A is subjected to thinning with the periodicity shown in FIG. 18, the results of addition of the conversion values show a smaller dispersion. This is because, due to the difference in the periodicity of the quantizing condition and of the thinning, the results of addition of the conversion values are averaged by the different phases in the thinning, thereby showing a smaller fluctuation.

Inversely, in a block employing the quantizing condition B at multiplexing, the thinning shown in FIG. 17 results in a smaller dispersion and that shown in FIG. 18 results in a larger dispersion.

In the example of the flow chart shown in FIG. 4, in which bit=0 and bit=1 are respectively assigned to the quantizing condition A and B, the situation bit=0 or bit=1 can be identified respectively if a large dispersion is found for the periodicity No.=0 or for the periodicity No.=1.

In summary, the multiplexing and separation can be easily realized by correlating the quantizing condition and the periodicity of the thinning condition. In the present embodiment, the periodicity No. is limited to two values of "1" and "0" and the multiplex code in the block is limited to 1 bit, but the multiplex code can naturally contain a larger information amount. Naturally the number of kinds of the quantizing condition and that of kinds (indicated by value I) of the periodicity No. of the thinning condition coincide mutually.

In the foregoing third embodiment, the codes can be easily separated without the comparison of the electric powers of the frequencies corresponding to the regularities of the quantizing conditions by orthogonal transformation. In addition, a process in the real space area allows to realize the separation process at a very high speed.

In the third embodiment described in the foregoing, the quantizing conditions A, B, and the thinning conditions merely constitute an example and are not restrictive. For example, there may be adopted other periodicities, and the block size for thinning may be made larger or smaller than in FIGS. 17 and 18.

Also the operation sequence shown in FIG. 16 adopts a repeating process based on the variable i constituting the periodicity No. and the variable j constituting the phase No. for easier understanding of the concept of the present invention.

In practice, however, it is easier to adopt a repeating process based on the pixel addresses in the block of P×Q pixels. More specifically, such process can be realized by storing, in advance as a table, two information consisting of the periodicity No. and the phase No. for each pixel address in the block as shown in FIGS. 17 and 18, and adding the conversion values to the variables of the corresponding periodicity No. and phase No. Such process allows to calculate, in parallel, the added values of the groups of the periodicity No. and the phase No. by processing P×Q pixels only.

Also the operation sequence in FIG. 16 judges the code by calculating the dispersions of the results of addition of the thinned pixels and comparing the magnitude of the dispersions, but such process is not restrictive.

For example there can be conceived another method utilizing the comparison by an evaluating function not dependent on the dispersion. Such the results of addition of the thinned pixel values with the phase changes tend to show a distinct value only at a phase, it is desirable to evaluate the "level of scattering".

For evaluating the level of scattering, there can be conceived, for example, the following evaluating functions:
1) difference between the maximum and minimum values among the values of addition of the thinned conversion values;
2) difference between the maximum value and a second largest value, or difference between the minimum value a second smallest value, among the values of addition of the thinned conversion values; and
3) maximum difference, in a histogram of the values of addition of the thinned conversion values, between the two neighboring values.

The above-mentioned evaluating functions 1, 2, 3 utilize absolute difference values, but a relative ratio of such difference to the conversion value, the pixel value or the total sum of the pixel values or conversion values may also be employed as an evaluating function. Also in the foregoing description, binary digitization has been explained as an example of quantization, but such example is not restrictive.

As explained in the foregoing, the third embodiment allows to embed predetermined information in an image by changing the quantizing condition in the unit of a block of N×M pixels formed in the image and quantizing the image according to such quantizing condition, thereby achieving high-speed information embedding with reduced deterioration of the image quality and enabling precise extraction of the embedded information, in comparison with the conventional information embedding method, for example based on the orthogonal transformation.

Also the aforementioned predetermined information can be extracted by dividing the image, in which the predetermined information is embedded, into image areas of P×Q pixels each, thinning the pixels with the predetermined regularity on thus divided image areas, detecting a feature amount based on the thinned pixels and utilizing thus detected feature amount, whereby the information embedded in the image can be extracted at a higher speed and with a higher precision, in comparison with the conventional information extracting method, for example based on the orthogonal transformation.

Therefore, the embodiment can realize the embedding and separation of information into or from the image easily and promptly, thereby enabling to provide services and applications of embedding audio information or secret information in the image information. It is also rendered possible to prevent illegal forging of the banknotes, stamps, valuable papers etc., and to avoid infringement of the copyright of the image information.

[Fourth Embodiment]

Figure 19:
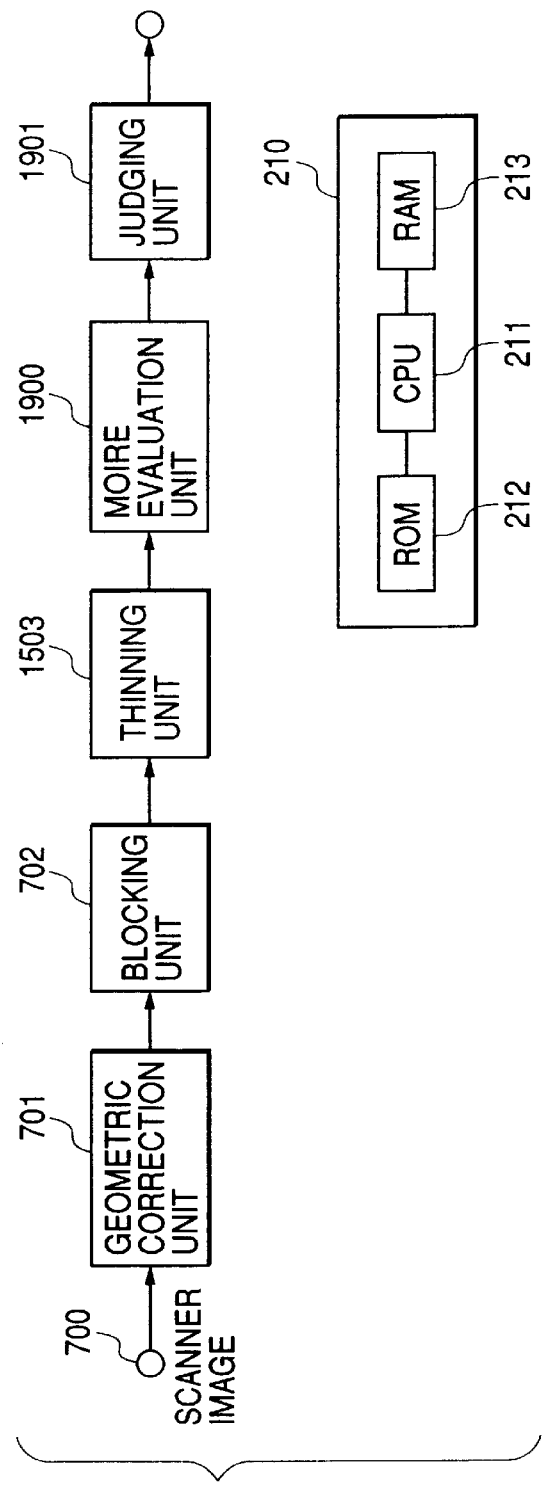
FIG. 19 is a schematic block diagram showing the configuration of an additional information separating device in a fourth embodiment.
Figure 20:
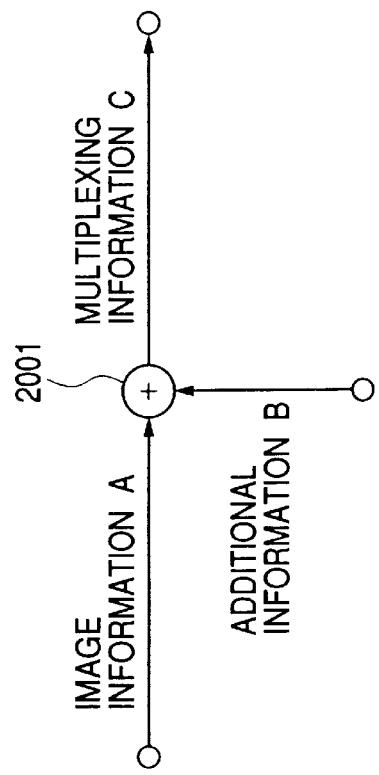

FIG. 19 is a block diagram showing an additional information separating device in a fourth embodiment. As the configuration shown in FIG. 15 is different merely in a part from that of the additional information separating device shown in FIGS. 7 and 16, equivalent components are represented by corresponding numbers and the following description will be given only on the different points.

Referring to FIG. 19, a moire evaluation unit 1900 evaluates the generation of a moire pattern (fold-back distortion) based on the result of thinning in a thinning unit 1503.

A judging unit 1901 judges the multiplexed code based on the result of evaluation of the moire pattern.

Thus, the fourth embodiment judges the difference in the periodicity in the quantizing condition at multiplexing, by the difference in the generated moire pattern.

For example in a block quantized with the quantizing conditions A, B shown in FIGS. 6A and 6B, a large electric power tends to be generated in a region of the periodicity of the gray squares, both in FIG. 6A and FIG. 6B. More specifically, in the quantizing condition A, the region generating the large electric power is present lower in the horizontal direction and higher in the vertical direction, in comparison with the quantizing condition B. The moire pattern is evaluated utilizing the anisotropic nature in these directions.

In case the thinning process is executed with a same interval for the horizontal and vertical directions, the quantization can be estimated to be based on the quantizing condition A or B respectively if the moire pattern is generated principally in the vertical direction or in the horizontal direction.

It is also possible to evaluate the difference in the moire pattern generation, based on the plural thinning processes with changes in the regularity as in the foregoing third embodiment.

FIG. 19 shows an example of executing the thinning process on the image information after input by the scanner and evaluating the moire pattern generation, but, in such case, the moire pattern generation becomes difficult unless the scanner employed in the input operation has a high resolution.

In addition to the configuration shown in FIG. 19, there can also be conceived a method of executing the thinning process at the input operation by the scanner. In such case, however, the configuration has to be such that a LPF (low pass filter) for cutting off the high frequency region is not contained in front the sampling stage, in order to facilitate the moire pattern generation at the sampling operation in the scanner.

As explained in the foregoing, the fourth embodiment allows to efficiently extract the information embedded in the image at a high speed, by dividing the image into image areas of P×Q pixels each, executing the thinning process for the pixels with the predetermined regularity on thus divided image areas, evaluating the generation of moire pattern (fold-back distortion) based on the pixels subjected to the thinning process, and extracting the information embedded in the image based on the result of evaluation, whereby the information embedded in the image can be extracted at a higher speed and with a higher precision, in comparison with the conventional information extracting method, for example based on the orthogonal transformation.

As explained in the foregoing, the information attached to the image can be extracted at a high speed and with a high precision, by thinning the pixels according the predetermined regularity, then detecting a feature amount based on thus thinned pixels and extracting the predetermined information based on such feature amount.

[Other Embodiments]

In the foregoing first to fourth embodiments, the image is divided into blocks at the separation of information from the image, in order to attach a large amount of information to the image.

Therefore, if the additional information attached to the image is 1-bit information (for example "information permitting or not permitting the image output"), the information can be attached without block formation of the image at the information attaching operation. Consequently the block formation of the image is not necessarily essential at the separation of the information.

Also in the foregoing first to fourth embodiments, there have been explained methods of extracting the embedded information from the image information by executing the pseudo gradation process utilizing the error diffusion method on the input image information, but the embedding method for the information to be extracted is not limited to the error diffusion method. For example the information may be embedded by a pseudo gradation process utilizing the dither method.

Also in the foregoing first to fourth embodiments, there has been explained the separation of the multiplexed additional signal from the print, but the separating method of the present invention is not limited to such application. It can be used as a novel separation (decoding) method for separating the additional information from electronic information which is not in the form of a print, namely from an electronic file, or in the field of so-called digital watermarking technology.

As explained in the foregoing, the digital watermarking technology can be generally classified into a method of multiplexing the additional information in the real space area and a method of multiplexing in the frequency area. In the latter, namely in the method of multiplexing the information in a specified band in the image information by orthogonal transformation and identifying the code by the difference in the band, the aforementioned method allows to judge the band in which the information is multiplexed. Thus, in the field of digital watermarking technology, there can be realized a method of enabling very fast separation (decoding) in comparison with the conventional technology for separating (decoding) the additional information by orthogonal transformation.

Also in the foregoing first to fourth embodiments, there have been explained the additional information multiplexing device and the additional information separating device, but the present invention is not limited to the combination of such devices.

The present invention may be applied to a system consisting of plural equipment (for example host computer, interface devices, reader, printer etc.) or an apparatus consisting of a single equipment (such as a copying machine or a facsimile apparatus).

Also the objects of the present invention can naturally be attained in a case where a storage medium (or recording medium) storing the program codes of a software realizing the functions of the aforementioned embodiments is supplied to a system or an apparatus and a computer (or a CPU or an MPU) of the system or the apparatus reads and executes the program codes stored in the storage medium. In such case the program codes themselves read from the storage medium realize the functions of the aforementioned embodiments, and the storage medium storing the program codes constitutes the present invention. The present invention also includes such program codes not only in a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

What is claimed is:

1. An image processing apparatus comprising:

input means for entering an image in which predetermined information is embedded in a manner so that the predetermined information is not easily recognized visually;

process means for filtering the entered image with plural filters having different characteristics respectively;

detection means for detecting plural feature amounts based on conversion values obtained by said filtering; and extraction means for extracting the predetermined information, based on the detected plural feature amounts, wherein the predetermined information is embedded based on the characteristics of the plural filters, wherein said image processing apparatus further comprises (a) thinning means for executing a thinning process according to a predetermined regularity on the conversion values obtained by said filtering, and (b) adding means for adding the conversion values subjected to the thinning process by said thinning means, wherein said detection means detects the feature amounts based on a result of addition by said adding means, wherein the feature amounts are levels of scattering of the results of addition of the thinned conversion values corresponding to a change in a phase, and wherein the levels of scattering are either differences between the respective maximum values and the second largest values, or differences between the respective minimum values and the second smallest values.

2. An image processing apparatus according to claim 1, further comprising division means for dividing the entered image into plural image areas, wherein said process means executes filtering with the plural filters having different characteristics respectively on the image area divided by said division means.

3. An image processing apparatus according to claim 1, further comprising comparison means for comparing the detected plural feature amounts, wherein said extraction means extracts the predetermined information based on a result of comparison by said comparison means.

4. An image processing apparatus according to claim 1, wherein the feature amounts are the maximum values of the conversion values obtained by said filtering.

5. An image processing apparatus according to claim 1, wherein the feature amounts are the differences between maximum and minimum values of the conversion values after said filtering.

6. An image processing apparatus according to claim 1, wherein the feature amounts are dispersion values of the conversion values after said filtering.

7. An image processing apparatus according to claim 1, wherein the levels of scattering are dispersion values.

8. An image processing apparatus according to claim 1, wherein the levels of scattering are differences between maximum and minimum values.

9. An image processing apparatus according to claim 1, wherein said regularity is a period of thinning.

10. An image processing apparatus according to claim 1, wherein said period of thinning is provided in plural kinds, and the frequency characteristics by the thinning become equal to the characteristics of the plural filters having the different characteristics respectively.

11. An image processing apparatus according to claim 8, wherein said frequency characteristics are a direction of a two-dimensional frequency vector.

12. An image processing apparatus according to claim 1, wherein said predetermined information is audio information.

13. An image processing apparatus according to claim 1, wherein said predetermined information is information relating to a copyright of the image.

14. An image processing apparatus according to claim 1, wherein said predetermined information is embedded in the image in a manner not easily visible to human eyes.

15. An image processing apparatus according to claim 1, wherein said process means executes parallel filtering on the entered image with the plural filters having different characteristics respectively.

16. An image processing method comprising:
an input step of entering an image in which predetermined information is embedded in a manner so that the predetermined information is not easily recognized visually;
a process step of filtering the entered image with plural filters having different characteristics respectively;
a detection step of detecting plural feature amounts based on conversion values obtained said filtering; and
an extraction step of extracting the predetermined information, based on the detected plural feature amounts,
wherein the predetermined information is embedded based on the characteristics of the plural filters,
wherein said method further comprises (a) a thinning step for executing a thinning process according to a predetermined regularity on the conversion values obtained by said filtering, and (b) an adding step for adding the conversion values subjected to the thinning process by said thinning step, wherein said detection step detects the feature amounts based on a result of addition by said adding step,
wherein the feature amounts are levels of scattering of the results of addition of the thinned conversion values corresponding to a change in a phase, and
wherein the levels of scattering are either differences between the respective maximum values and the second largest values, or differences between the respective minimum values and the second smallest values.

17. A computer readable storage medium comprising:
an input code of entering an image in which predetermined information is embedded in a manner so that the predetermined information is not easily recognized visually;
a process code of filtering the entered image with plural filters having different characteristics respectively;
a detection code of detecting plural feature amounts based on conversion values obtained by said filtering; and
an extraction code of extracting the predetermined information, based on the detected plural feature amounts,
wherein the predetermined information is embedded based on the characteristics of the plural filters,
wherein said medium further comprises (a) a thinning code of executing a thinning process according to a predetermined regularity on the conversion values obtained by said filtering, and (b) an adding code of adding the conversion values subjected to the thinning process by said thinning code, wherein said detection code detects the feature amounts based on a result of addition by said adding code,
wherein the feature amounts are levels of scattering of the results of addition of the thinned conversion values corresponding to a change in a phase, and
wherein the levels of scattering are either differences between the respective maximum values and the second largest values, or differences between the respective minimum values and the second smallest values.

* * * * *

UNITED STATES PATENT AND TRADEMARK OFFICE
CERTIFICATE OF CORRECTION

PATENT NO. : 6,853,736 B2
DATED : February 8, 2005
INVENTOR(S) : Nobutaka Miyake It is certified that error appears in the above-identified patent and that said Letters Patent is hereby corrected as shown below:

Title page,
Item [56], References Cited, OTHER PUBLICATIONS,
"Kiyoshi Tanaka, et al." (first occurrence) reference, "261-220" should read -- 216-220 --; and
"R. Floyd, et al." reference, "36-27" should read -- 36-37 --.

Drawings,
Sheet 17, Fig. 22, Item 2201, "OROCESS" should read -- PROCESS --.

Column 7,
Line 18, "blacks" should read -- blocks --.

Column 13,
Line 48, "minimum value" should read -- minimum value and --.

Column 17,
Line 42, "minimum value" should read -- minimum value and --.

Column 18,
Line 65, "front" should read -- front of --.

Column 19,
Line 16, "according" should read -- according to --.

Column 22,
Line 2, "obtained" should read -- obtained by --.

Signed and Sealed this

Second Day of May, 2006

JON W. DUDAS
*Director of the United States Patent and Trademark Office*